United States Patent [19]

Iwasaki et al.

[11] Patent Number: 4,663,578
[45] Date of Patent: May 5, 1987

[54] INVERTER CONTROL APPARATUS

[75] Inventors: Masahiko Iwasaki; Masayuki Katto, both of Aichi, Japan

[73] Assignee: Mitsubishi Denki Kabushiki Kaisha, Tokyo, Japan

[21] Appl. No.: 735,649

[22] Filed: May 20, 1985

[30] Foreign Application Priority Data

May 21, 1984 [JP] Japan .............................. 59-102362
Jul. 5, 1984 [JP] Japan .............................. 59-137878

[51] Int. Cl.$^4$ ............................ H02P 3/18; H02P 5/40
[52] U.S. Cl. ..................................... 318/762; 318/811
[58] Field of Search .............. 318/803, 807–811, 318/759–762

[56] References Cited

U.S. PATENT DOCUMENTS

| | | |
|---|---|---|
| 3,593,103 | 7/1971 | Chandler et al. .................. 318/808 |
| 3,899,725 | 8/1975 | Plunkett .............................. 318/811 |
| 4,019,105 | 4/1977 | Cornell et al. ...................... 318/803 |
| 4,186,334 | 1/1980 | Hirata ................................. 318/805 |
| 4,420,718 | 12/1983 | Sakai et al. ......................... 318/729 |
| 4,437,050 | 3/1984 | Overzet .............................. 318/803 |
| 4,442,394 | 4/1984 | Beierholm et al. ................. 318/807 |

FOREIGN PATENT DOCUMENTS 1020214 2/1966 United Kingdom .
1193979 6/1970 United Kingdom .

Primary Examiner—David Smith, Jr.
Attorney, Agent, or Firm—Bernard, Rothwell & Brown

[57] ABSTRACT

An inverter control apparatus contrived for improving the torque characteristic of an induction motor, wherein a current inputted to the induction motor is continuously detected, and the output voltage of the inverter is corrected by a voltage corresponding to a variation in the detected current.

5 Claims, 7 Drawing Figures

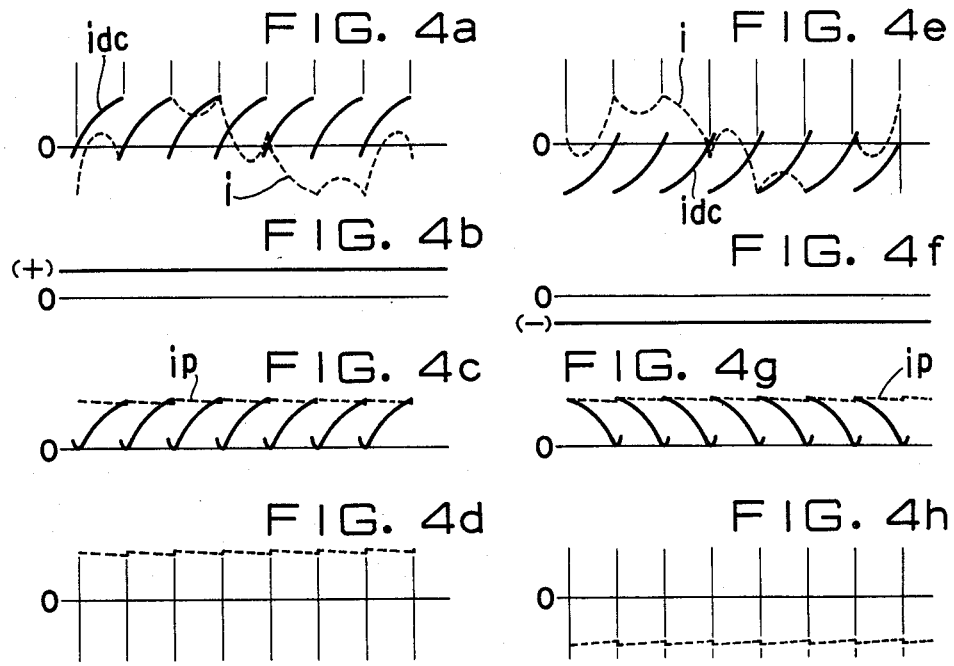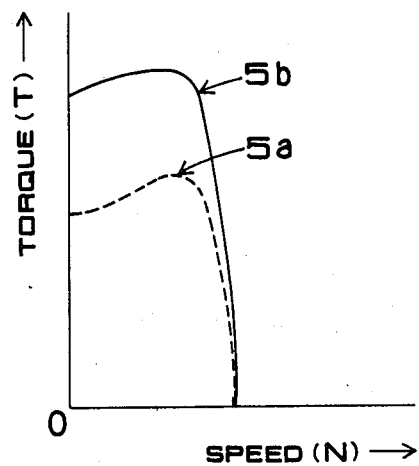

4,663,578

INVERTER CONTROL APPARATUS

BACKGROUND OF THE INVENTION

1. Field of the Invention

The present invention relates to a control apparatus for an inverter and, more particularly, to a novel control apparatus which is capable of improving the torque characteristic of an induction motor to enhance the driving performance thereof.

2. Description of the Prior Art

The conventional control apparatus of such type known heretofore has a constitution comprising, as shown in FIG. 1, an AC power supply 1, an AC-DC converter 2 for converting an AC output of the power supply 1 to a direct current, a smoothing capacitor 3 connected in parallel with the output of the AC-DC converter 2, a DC-AC inverter 4 for producing a new alternating current by converting the direct current charged in the smoothing capacitor 3, an induction motor 5 functioning as a prime mover while being supplied with the AC power from the inverter 4, a frequency setting circuit 6, a cushion circuit 7 for enabling smooth follow-up with respect to the frequency set in the circuit 6, a voltage-frequency ratio circuit for producing a voltage command relative to the frequency, and a PWM generator 9 for determining the timing to switch the output of the inverter 4 in response to the voltage command produced from the voltage-frequency ratio circuit In the constitution mentioned above, the following circuit operation is performed. When the frequency corresponding to a desired speed is set by the frequency setting circuit 6, the cushion circuit 7 functions in response to the output of the frequency setting circuit 6 and produces a frequency command for enabling follow-up with respect to the preset speed in such a manner as not to bring about any abrupt change in the current running speed of the inverter.

In this stage, the frequency command from the cushion circuit 7 is applied to the voltage-frequency ratio circuit 8, which then produces a voltage command in accordance with a predetermined voltage-frequency ratio.

The PWM generator 9 receives both the frequency command from the cushion circuit 7 and the voltage command from the voltage-frequency ratio circuit 8, and generates a PWM signal to turn on or off a switching element such as a thyristor in the inverter 4.

In the conventional inverter control apparatus of the above constitution, a slip S becomes great in the case of a heavy load when driving the induction motor 5 by the AC output of the inverter 4 and thereby decreases the impedance of a secondary circuit in the equivalent of the induction motor shown in FIG. 2, hence reducing the excitation winding voltage E. Consequently, the resultant magnetic flux is diminished to bring about a reduction in the output torque. Such a disadvantage is conspicuous particularly in a low frequency range.

SUMMARY OF THE INVENTION

The present invention has been accomplished in an attempt to eliminate the disadvantage observed in the conventional apparatus. And its object resides in providing an improved inverter control apparatus which corrects the torque dropping characteristic of an induction motor derived from magnetic flux reduction by continuously detecting an input current to the induction motor to obtain a corrective voltage corresponding to a current variation and then correcting the output voltage of the inverter by the application of such corrective voltage.

BRIEF DESCRIPTION OF THE DRAWINGS

FIG. 4 shows current waveforms in the operation of the exemplary embodiment according to the invention;

FIG. 5 graphically represents torque characteristic with a speed plotted along the abscissa and a torque along the ordinate;

DESCRIPTION OF THE PREFERRED EMBODIMENTS

Figure 1:
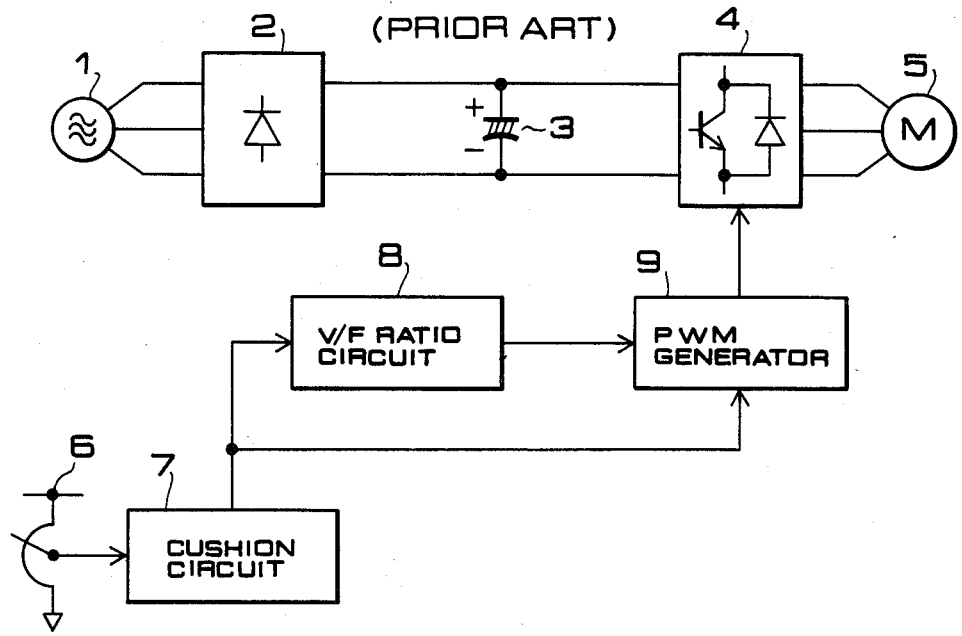
FIG. 1 is a circuit diagram of a conventional inverter control apparatus.

Hereinafter a first exemplary embodiment of the present invention will be described with reference to FIG. 3 where the same reference numerals as those used previously in FIG. 1 denote the same components. In FIG. 3, a current detector 10 serves to detect a direct current in a DC bus connecting a smoothing capacitor 3 to an inverter 4 and produces an output voltage proportional to the detected current, and a current-value preset circuit 11 presets a value of no-load current relative to an induction motor 5. There are also shown a subtracter 13 for subtracting the preset current value from the output of the current detector 10 and thereby detecting a current variation caused by a load; a corrective voltage output circuit 12 for producing a voltage proportional to the current variation with its proportional constant being substantially equivalent to the primary impedance ($r_1$ in FIG. 2) of the induction motor; and an adder 14 for adding the corrective voltage of the above circuit 12 to the output voltage of the voltage-frequency ratio circuit 8. The result of such addition is applied to the PWM generator 9 together with the frequency command obtained from the cushion circuit 7.

Figure 2:
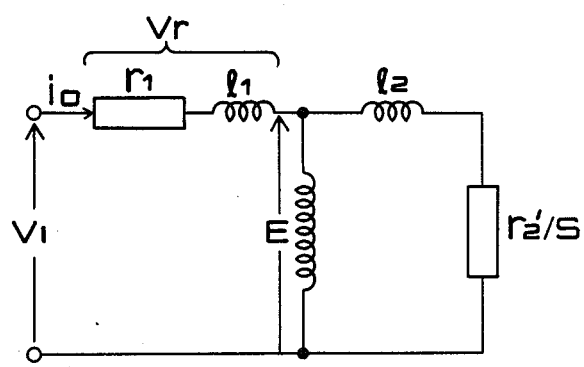
FIG. 2 is a T-type equivalent circuit diagram of an induction motor.
Figure 3:
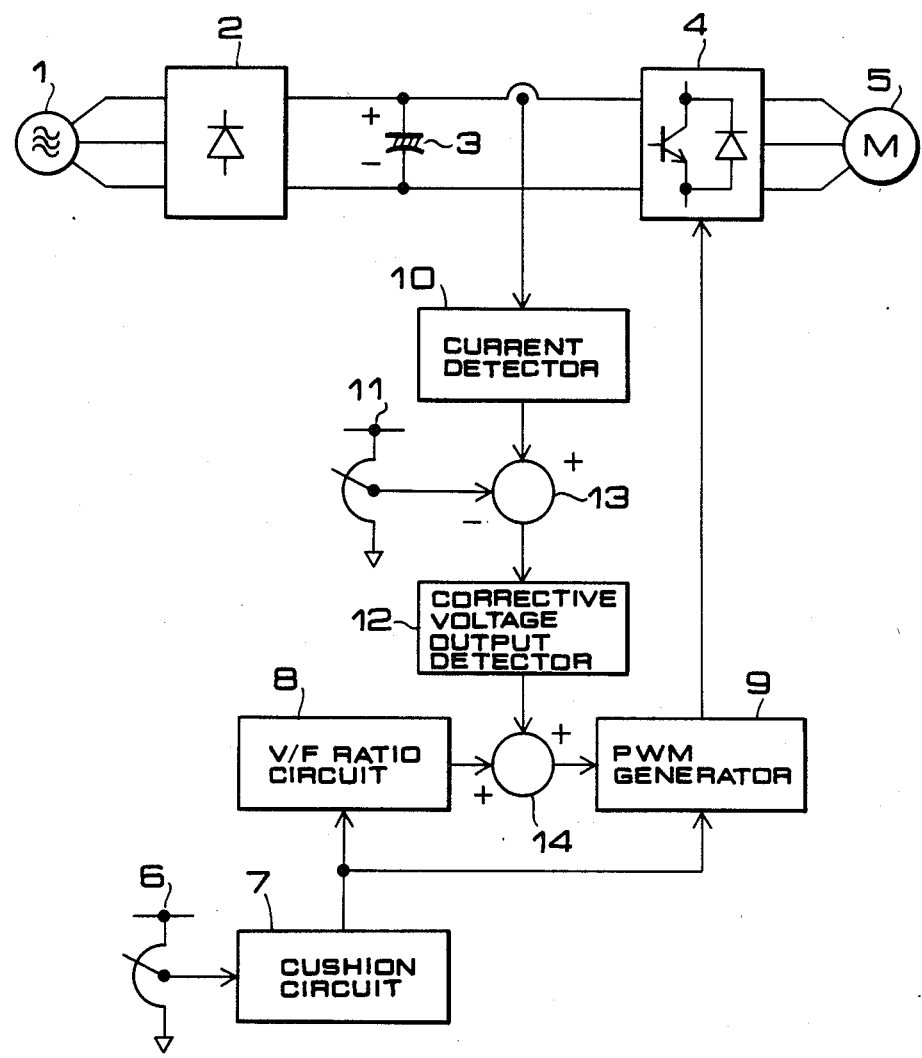
FIG. 3 is a circuit diagram of an exemplary inverter control apparatus embodying the present invention.

In FIG. 2 showing an equivalent circuit of the induction motor 5, a no-load voltage E across an excitation winding is given by Eq. (1) with regard to a no-load current $i_0$.

$$E = V_1 - (r_1 + Pl_1)i_0 \qquad (1)$$

where $P = (d/dt)$ $r_1$: impedance of primary winding $l_1$: leakage inductance of primary winding Supposing now that the load becomes greater to increase the slip S and thereby changes the no-load current $i_0$ to $i_0 + \Delta i$, then the excitation winding voltage is altered as $$\begin{aligned} E' &= V_1 - (r_1 + Pl_1)(i_0 + \Delta i) \\ &= V_1 - (r_1 + Pl_1)i_0 - (r_1 + Pl_1)\Delta i \end{aligned} \qquad (2)$$

Consequently, the excitation winding voltage is reduced by a value of $(r_1+Pl1)\Delta i$. The feature of this invention lies in correcting such voltage reduction by the voltage V1 to maintain the excitation winding voltage E constant.

In the exemplary embodiment of this invention having the constitution mentioned above, the following operation is performed.

Initially the current detector 10 functions to detect the peak value of the direct bus current. (a) and (c) in FIG. 4 respectively show, on the same scale, waveforms of the direct bus current idc and the alternating conductor current i of one of three phases when the output voltage of the inverter 4 has a square waveform, wherein the peak value ip of the direct bus current idc is coincident with that of the conductor current i.

In the meanwhile, the peak value of the conductor current i is expressed as $\sqrt{2}$ (effective value of fundamental wave in conductor current i)+$\frac{1}{2}$ (ripple of higher harmonic), in which the ripple of the higher harmonic is substantially fixed regardless of the fundamental-wave effective value in the conductor current i. Therefore, the fundamental-wave effective value in the conductor current i can be obtained by detecting the peak value ip of the direct bus current idc and then subtracting the fixed harmonic ripple therefrom.

Accordingly, the peak value ip of the direct bus current idc is first detected by the current detector 10 and, after the aforementioned circuit computation, an output voltage corresponding to the fundamental-wave effective value in the conductor current i is produced from the detector 10. When detecting the direct bus current idc, a single current detector is capable of executing such detection at a frequency six times the output frequency of the inverter, hence ensuring higher efficiency with respect to both response time and economy in comparison with the prior art of detecting the output current of the inverter.

In the next stage, a value corresponding to the no-load current $i_0$ in Eq. (2) is set by the current-value preset circuit 11 and then is subtracted from the output of the current detector 10. Thus, a current variation $\Delta i$ in Eq. (2) caused by the load is obtained as a result of such computation. The corrective voltage output circuit 12 produces a corrective voltage which is a multiple of the aforesaid current variation $\Delta i$ by a factor of $r_1$. To be exact, the latter should be multiplied by $(r_1+Pl1)$ in the corrective voltage output circuit 12. However, l1 is so minute as to be negligible.

The corrective voltage obtained from the circuit 12 is added to the output voltage of the voltage-frequency ratio circuit 8, and the combined voltage is applied to the PWM generator 9 together with the frequency command from the cushion circuit 7.

Due to the operation described above, the excitation winding voltage E shown in the equivalent circuit of FIG. 2 is maintained constant despite any current variation caused by a heavy load, so that it becomes possible to eliminate insufficiency of the torque that may otherwise result from a reduction in the magnetic flux during heavy-load running.

FIG. 5 graphically shows improvements achieved with respect to the torque characteristic in the above embodiment, wherein a speed is plotted along the abscissa and a torque along the ordinate. In FIG. 5, a dotted curve 5a represents an exemplary characteristic without any correction, while a solid curve 5b represents one obtained with correction. As is clear from comparison of the two curves 5a and 5b, a wide torque difference is existent when the slip is great.

Although in the foregoing embodiment the no-load current of the induction motor is selected as a value to be set in the current preset circuit 11, some other value may be selected as well. For example, in case a value greater than the no-load current is set, the torque correction effect is rendered smaller as compared with that in the no-load current setting, so that the circuit configuration of the foregoing embodiment becomes applicable to a case where a torque correction effect is required. Furthermore, differing from the above embodiment where the charge voltage of the smoothing capacitor is fed to the inverter, a DC power supply is also employable in place of such smoothing capacitor.

A second exemplary embodiment of the present invention will now be described below with reference to FIG. 6, in which the same reference numerals as those used previously in FIG. 1 denote the same component. There are further shown a momentary current detector 101 for detecting the momentary value of the direct bus current; a mode discriminator 15 for discriminating between a power running mode and a regenerative running mode in accordance with whether the mean value of the output of the momentary current detector 101 is positive or negative in polarity; an absolute value circuit 16 for producing a positive output proportional to the current of the momentary current detector 101; and a polarizer circuit 17 functioning in response to the output of the mode discriminator 15 and affixing to the absolute-value output a positive sign in a power running mode or a negative sign in a regenerative running mode.

In the constitution mentioned above, the following operation is performed. Referring first to FIG. 4, an explanation will be given with regard to the relationship between the direct bus current and the output current in both a power running mode and a regenerative running mode and also with regard to the principle of operation for executing mode discrimination on the basis of the direct bus current and providing, in the circuit 16, an absolute output value proportional to the output current. In FIG. 4, however, there are shown current waveforms obtained when a rectangular output voltage is produced with the influence of PWM being neglected, so as to simplify the explanation. Although the current waveform in sine-wave approximation PWM becomes sinusoidal, the basic relationship is supposed to remain unchanged in PWM as well.

In FIG. 4, (a) through (d) relate to an operation performed in a power running mode, while (e) through (h) relate to one in a regenerative running mode. The waveforms shown in (a) and (e) represent the output current i (alternating conductor current of one phase) and the direct bus current idc in a power running mode and a regenerative running mode, respectively. In the power running mode, the positive maximum (peak) value of the direct bus current idc is coincident with the peak value of the output current i. Meanwhile, in the regenerative running mode, the negative maximum value of the direct bus current idc is coincident with the peak value of the output current i. Therefore, if discrimination can be carried out between the power running mode and the regenerative running mode on the basis of such phenomena, it becomes possible to find the peak value of the output current i from the direct bus current idc. It also follows that, since the absolute peak value of the direct bus current idc is coincident with the peak value of the output current i, the latter or the effective level is obtainable by observing the direct bus current idc.

Discrimination between the power running mode and the regenerative running mode is executed in the following procedure. First during the power running mode, the inverter supplies electric power to the motor with its DC output being positive, so that the mean value of the direct bus current idc is positive. The current waveform in this stage is shown, by (b) in FIG. 4. Meanwhile, during the regenerative running mode where electric power is supplied inversely from the motor to the inverter, the mean value of the direct bus current idc becomes negative as shown by (f) in FIG. 4. Consequently, the power running mode and the regenerative running mode can be discriminated from each other depending on whether the mean value of the direct bus current idc is positive or negative in polarity. In FIG. 4, (c) and (g) show the absolute value of the direct bus current idc and its peak value ip, in the power running mode and in the regenerative running mode respectively. In FIG. 4, (d) and (h) show waveforms shaped by affixing to the peak value ip the polarities obtained in (b) and (f) respectively.

Now the operation performed in the embodiment of FIG. 6 will be described below.

Initially the direct bus current idc is detected by the momentary current detector 101. As shown in FIG. 6, the mean value of the aforesaid current idc from the mode discriminator 15 is judged to discriminate between the power running mode and the regenerative running mode depending on whether the mean value is positive or negative in polarity. In the next stage, the absolute value of the direct bus current idc is obtained in the circuit 16, and the peak value thereof is held. The detected value is coincident with the peak value of the output current i as shown in FIG. 4. As described previously, the peak value of the output current i is a sum of $\sqrt{2}$ (effective value of fundamental wave in output current i) and ½ (ripple of higher harmonic), in which the harmonic ripple is substantially fixed regardless of the fundamental-wave effective value in the output current i. Therefore, such fundamental-wave effective value is obtainable by first detecting the peak value ip of the direct bus current idc and then subtracting the fixed harmonic ripple therefrom. Thus, the absolute value circuit 16 executes the above-described computation and produces an output signal corresponding to the fundamental-wave effective value in the output current i.

The polarizer circuit 17 functions in accordance with the output of the mode discriminator 15 and renders the output of the absolute value circuit 16 positive in the power running mode or negative in the regenerative running mode.

In the current-value preset circuit 11, a value corresponding to the no-load current $i_0$ in Eq. (2) is preset and then is subtracted from the output of the polarizer circuit 17. Such computation provides a load-caused current variation $\Delta i$ in Eq. (2). The corrective voltage output circuit 12 multiplies the current variation $\Delta i$ by a factor of $r_1$ to produce an output voltage for correction. To be exact, the multiplier should be $(r_1 + Pl1)$ in the corrective voltage output circuit 12, but l1 is so minute as to be negligible. The output of this circuit 12 is added to the output of the voltage-frequency ratio circuit 8, and the combined voltage is inputted to the PWM generator 9.

Due to the operation mentioned above, despite any current variation caused by the load, the output voltage is corrected incrementally in the power running mode or decrementally in the regenerative running mode, whereby the voltage E in FIG. 2 is maintained constant to eliminate insufficiency of the torque that may otherwise result from a reduction occurring in the magnetic flux with a heavy load in the power running mode, and any overexcitation phenomenon with a heavy load can be averted in the regenerative running mode.

Figure 6:
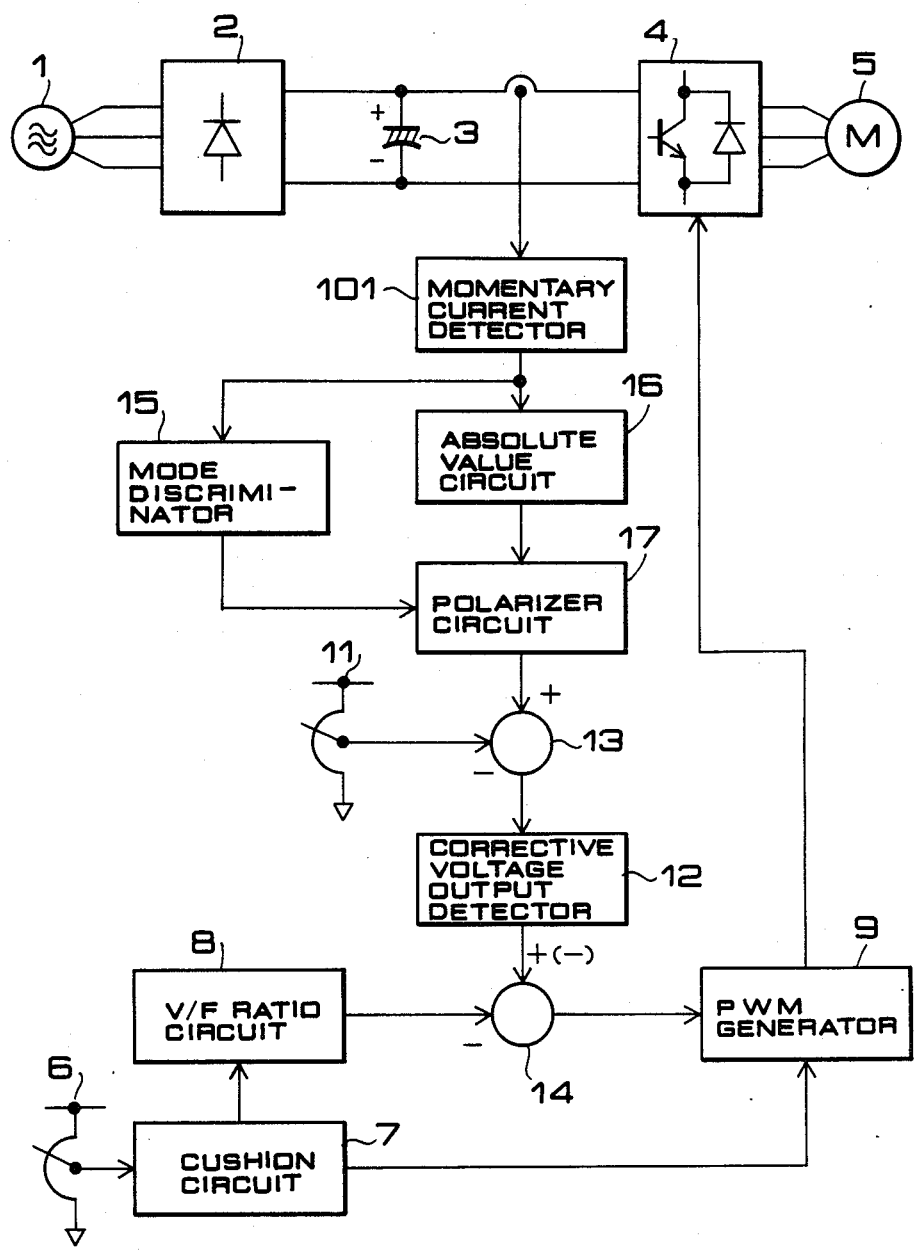
FIG. 6 is a ciruit block diagram of another exemplary inverter control apparatus embodying the invention.
Figure 7:
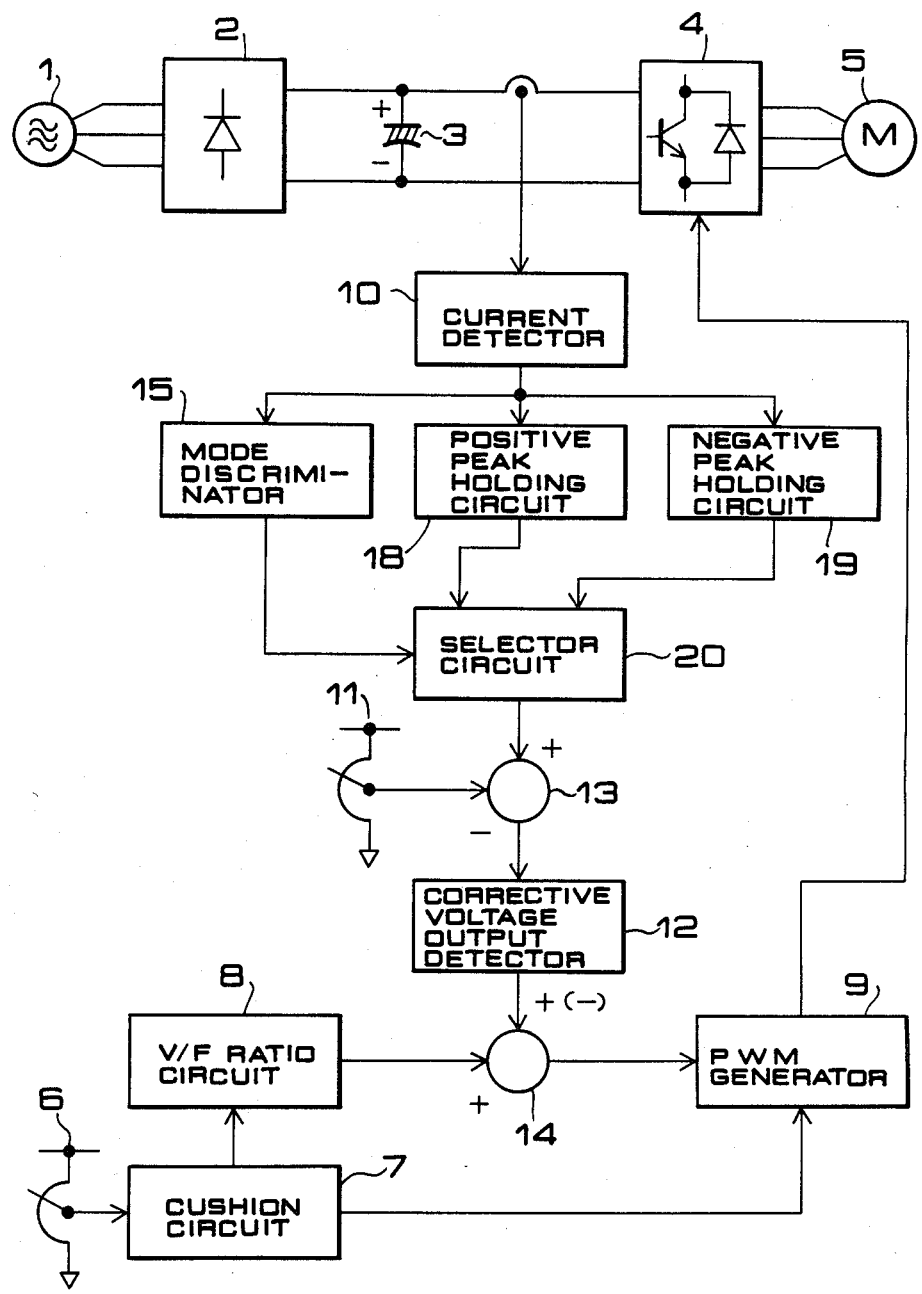
FIG. 7 is a circuit block diagram of a further exemplary control apparatus embodying the invention.

In FIG. 7 showing the constitution of a third exemplary inverter control apparatus embodying the invention, a positive peak holding circuit 18 and a negative peak holding circuit 19 are provided in place of the absolute value circuit 16 and the polarizer circuit 17 employed in FIG. 6, so as to selectively hold a positive peak value in the power running mode or a negative peak value in the regenerative running mode. The output of a selector circuit 20 is such as shown by (d) and (h) in FIG. 4. Although this exemplary embodiment is designed in regard to a PWM inverter, the modulation system may be some other one as well, and a microprocessor may be employed for computing the corrective voltage from the current detector output.

In the above-described embodiment where the input current to the motor is detected from the direct bus current of the inverter, its mean value is calculated to discriminate between a power running mode and a regenerative running mode and, in response to occurrence of any current variation, a resultant reduction in the primary impedance is automatically corrected in conformity to the running mode. Thus, it becomes possible to achieve various advantages including high response characteristic and continuous maintenance of an adequate excitation magnetic flux to eventually eliminate insufficiency of the torque while averting overexcited running.

As mentioned hereinabove, according to the present invention where the input current to the induction motor is detected successively to correct any primary-impedance reduction in the motor that results from a current variation, advantages are attainable to prevent decrease of the excitation magnetic flux for the induction motor during a heavy-load operation as well as to eliminate insufficiency of the torque in such operation. Furthermore, owing to the capability of establishing a no-load current level by the current preset circuit 11, a proper action can be executed without the necessity of altering the circuit constant despite replacement of the induction motor serving as a load.

What is claimed is:
1. An inverter control apparatus comprising:
    an inverter circuit for converting a direct current to an alternating current and feeding the latter to a motor;
    a cushion circuit functioning in response to the output of a frequency setting circuit and producing a frequency command which is free from inducing any abrupt change in the running speed of said inverter circuit;
    a voltage-frequency ratio circuit for deciding, in response to said frequency command, an output voltage at a predetermined voltage-frequency ratio;
    a current detector for detecting the current inputted to said motor;
    a current-value preset circuit for presetting no-load current value relative to said motor;

a subtracter circuit for subtracting the detected current value of said current detector from the current value preset by said current-value preset circuit;

a corrective voltage output circuit for producing an output voltage corresponding to a current variation caused by the load of said motor and obtained from said subtracter circuit; and a PWM generator circuit for determining the timing to switch said inverter circuit in response to the result of adding the respective output voltages of said corrective voltage output circuit and said voltage-frequency ratio circuit and also in response to the frequency command based on the output frequency of said frequency setting circuit;

said inverter circuit being equipped with a mode discriminator to discriminate between a power running mode and a regenerative running mode; and when said inverter circuit is judged to be in a power running mode by said mode discriminator, a voltage command substantially proportional to the output of said subtracter circuit is added to the output of said voltage-frequency ratio circuit; and when said inverter circuit is judged to be in a regenerative running mode by said mode discriminator, a voltage command substantially proportional to the output of said subtracter circuit is subtracted from the output of said voltage-frequency ratio circuit.

2. The inverter control apparatus as defined in claim 1, wherein said current detector detects the peak value of the direct bus current in said inverter circuit.

3. The inverter control apparatus as defined in claim 1, wherein said current detector is a momentary current detector for detecting the momentary value of the direct bus current inputted to said motor.

4. The inverter control apparatus as defined in claim 1, wherein discrimination between a power running mode and a regenerative running mode of said inverter circuit is carried out in accordance with whether the mean value of the output of said momentary current detector is positive or negative in polarity.

5. The inverter control apparatus as defined in claim 1, wherein peak holding voltages are obtained by detecting the positive and negative peak values of the direct bus current, and a positive or negative peak holding voltage is selectively outputted in conformity to the power running mode or the regenerative running mode of said inverter circuit.

* * * * *

UNITED STATES PATENT AND TRADEMARK OFFICE
CERTIFICATE OF CORRECTION

PATENT NO. : 4,663,578
DATED : May 5, 1987
INVENTOR(S) : Masahiko Iwasaki et al.

It is certified that error appears in the above-identified patent and that said Letters Patent is hereby corrected as shown below:

Column 2, line 18, "ciruit" should be --circuit--;

line 54, in equation (1), change "P/l" to --P$\ell$1--;

line 59, change "l1" to --$\ell$1--;

line 65, in equation (2), first line, change "P/l" to --P$\ell$1--.

line 67, in equation (2), second line, change "P/l" (both occurrences) to --P$\ell$1--.

Column 3, line 2, change "Pl1" to --P$\ell$1--;

line 47, change "Pl1" to --P$\ell$1--;

line 48, change "l1" to --$\ell$1--.

Column 5, line 63, change "Pl1" to --P$\ell$1--.

UNITED STATES PATENT AND TRADEMARK OFFICE
CERTIFICATE OF CORRECTION

Page 2 of 2

PATENT NO. : 4,663,578
DATED : May 5, 1987
INVENTOR(S) : Masahiko Iwasaki et al.

It is certified that error appears in the above-identified patent and that said Letters Patent is hereby corrected as shown below:

Column 5, line 64, change "11" to -- $\ell 1$ --.

Signed and Sealed this

Ninth Day of February, 1988

Attest:

DONALD J. QUIGG

Attesting Officer

Commissioner of Patents and Trademarks